(12) United States Patent
Cogne et al.

(10) Patent No.: US 9,108,465 B2
(45) Date of Patent: Aug. 18, 2015

(54) TIRE COMPRISING CARCASS REINFORCING CORDS OF LOW PERMEABILITY AND TEXTILE THREADS ASSOCIATED WITH THE CARCASS REINFORCEMENT

(75) Inventors: Michael Cogne, Riom (FR); Bernard Jault, Aulnat (FR); Laurent Nadreau, Vic le Comte (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 773 days.

(21) Appl. No.: 13/141,692

(22) PCT Filed: Nov. 10, 2009

(86) PCT No.: PCT/EP2009/064922
§ 371 (c)(1),
(2), (4) Date: Sep. 19, 2011

(87) PCT Pub. No.: WO2010/072463
PCT Pub. Date: Jul. 1, 2010

(65) Prior Publication Data
US 2012/0000590 A1 Jan. 5, 2012

(30) Foreign Application Priority Data
Dec. 22, 2008 (FR) ..................... 08 58895

(51) Int. Cl.
*B60C 19/00* (2006.01)
*B60C 9/04* (2006.01)
(Continued)

(52) U.S. Cl.
CPC ................ *B60C 9/07* (2013.01); *B60C 9/0007* (2013.04); *B60C 9/0238* (2013.04); *B60C 9/08* (2013.01);
(Continued)

(58) Field of Classification Search
CPC ...... B60C 2019/008; B60C 9/07; B60C 9/04; B60C 9/0238; B60C 2009/0491; Y10T 152/10873
USPC ..................................... 156/87; 152/557, 450
See application file for complete search history.

(56) References Cited

U.S. PATENT DOCUMENTS

| | | | |
|---|---|---|---|
| 8,075,718 B2 * | 12/2011 | Chun et al. ................ | 156/87 X |
| 2002/0053386 A1 | 5/2002 | Hirachi et al. | |
| 2009/0101266 A1 * | 4/2009 | Barguet et al. | |

FOREIGN PATENT DOCUMENTS

| | | |
|---|---|---|
| EP | 1 602 780 | 12/2005 |
| FR | 2 536 017 | 5/1984 |

(Continued)

OTHER PUBLICATIONS

"Tire Cord", Kirk-Othmer Encyclopedia of Chemical Technology, Fourth Edition, vol. 24, John Wiley & Sons, Inc., 1997, pp. 169-170.*
(Continued)

*Primary Examiner* — Adrienne C Johnstone
(74) *Attorney, Agent, or Firm* — Cozen O'Connor (57) ABSTRACT

A tire having a radial carcass reinforcement, comprised of at least one layer of metal reinforcing elements, said tire comprising a crown reinforcement, which is itself covered radially with a tread, said tread being joined to two beads via two sidewalls. The metal reinforcing elements of at least one layer of the carcass reinforcement are non-hooped cords having, in the permeability test, a flow rate of less than 20 cm³/min and at least one layer of the carcass reinforcement being provided on at least one side with textile threads oriented mainly along a direction parallel to that of the metal reinforcing elements of said at least one carcass reinforcement layer, said textile threads being corrugated about this main direction.

16 Claims, 2 Drawing Sheets

(51) Int. Cl.
*B60C 9/07* (2006.01)
*B60C 9/02* (2006.01)
*B60C 9/00* (2006.01)
*B60C 9/08* (2006.01)
*B60C 9/09* (2006.01)
*D07B 1/06* (2006.01)

(52) U.S. Cl.
CPC . *B60C 9/09* (2013.01); *D07B 1/062* (2013.01); *B60C 2009/0491* (2013.04); *B60C 2019/008* (2013.04); *B60C 2200/06* (2013.04); *D07B 1/0626* (2013.01); *D07B 1/0633* (2013.01); *D07B 2201/2006* (2013.01); *D07B 2201/2023* (2013.01); *D07B 2201/2032* (2013.01); *D07B 2201/2046* (2013.01); *D07B 2201/2059* (2013.01); *D07B 2201/2061* (2013.01); *D07B 2201/2062* (2013.01); *D07B 2501/2046* (2013.01); *Y10T 152/10855* (2015.01); *Y10T 152/10873* (2015.01)

(56) References Cited

FOREIGN PATENT DOCUMENTS

| | | |
|---|---|---|
| FR | 2 795 751 | 1/2001 |
| FR | 2 873 721 | 2/2006 |
| FR | 2 873 721 A1 * | 2/2006 |
| JP | 02299903 A * | 12/1990 |
| JP | 05-294107 | 11/1993 |
| JP | 2002-088667 | 3/2002 |
| JP | 2008-279896 | 11/2008 |

OTHER PUBLICATIONS

English translation of JP 2-299903 A, Dec. 12, 1990.*

* cited by examiner

TIRE COMPRISING CARCASS REINFORCING CORDS OF LOW PERMEABILITY AND TEXTILE THREADS ASSOCIATED WITH THE CARCASS REINFORCEMENT

RELATED APPLICATIONS

This is a U.S. national stage under 35 USC §371 of application No. PCT/EP2009/064922, filed on Nov. 10, 2009.

This application claims the priority of French application no. 08/58895 filed Dec. 22, 2008, the entire content of which is hereby incorporated by reference.

FIELD OF THE INVENTION

The present invention relates to a tire having a radial carcass reinforcement and more particularly to a tire intended to equip heavy-goods vehicles running at sustained speed, such as, for example, lorries, tractors, trailers or buses.

BACKGROUND OF THE INVENTION

The reinforcement of tires, and especially of heavy-goods vehicle tires, is at the present time—and most often—formed from a stack of one or more plies conventionally denoted as "carcass plies", "crown plies", etc. This way of denoting the reinforcements derives from the manufacturing process, which consists in producing a series of semi-finished products in the form of plies, which are provided with often longitudinal thread-like reinforcing members that are subsequently assembled or stacked so as to build a tire blank. The plies are produced flat, with large dimensions, and are then cut up according to the dimensions of a given product. The assembly of the plies is also carried out, firstly, approximately flat. The blank thus produced then undergoes a forming operation so as to adopt the typical toroidal profile of tires. The semi-finished or "finish" products are then applied to the blank so as to obtain a product ready to be vulcanized.

Such a "conventional" process involves, in particular in respect of the phase of manufacturing the tire blank, the use of an anchoring element (generally a bead wire) used to anchor or retain the carcass reinforcement in the bead zone of the tire. Thus, for this type of process, a portion of all of the plies making up the carcass reinforcement (or only one part thereof) is turned up around a bead wire placed in the bead of the tire. This anchors the carcass reinforcement in the bead.

The generalization in industry of this type of conventional process, despite many variations in the way in which the plies and the assemblies are produced, has led those skilled in the art to use a vocabulary taken from the process: hence the generally accepted terminology comprising, in particular, the terms "plies", "carcass", "bead wire", "shaping", to denote the transition from a flat profile to a toroidal profile, etc.

Nowadays, there are tires which strictly speaking do not have "plies" or "bead wires" according to the above definitions. For example, document EP 0 582 196 discloses tires manufactured without the aid of semi-finished products in the form of plies. For example, the reinforcing elements of the various reinforcement structures are applied directly to the adjacent layers of rubber compounds, the whole assembly being applied in successive layers on a toroidal core, the shape of which results directly in a profile similar to the final profile of the tire under manufacture. Thus, in this case, there are no longer "semi-finished" products or "plies" or "bead wires". The base products, such as the rubber compounds and the reinforcing elements in the form of threads or filaments, are directly applied to the core. Since this core is toroidal in shape, it is no longer necessary to form the blank in order to go from a flat profile to a torus-shaped profile.

Moreover, the tires disclosed in the above document do not have the "conventional" carcass ply upturn around a bead wire. This type of anchoring is replaced with an arrangement in which circumferential threads are placed adjacent to said sidewall reinforcement structure, the whole assembly being embedded in an anchoring or bonding rubber compound.

There are also assembly processes on a toroidal core using semi-finished products especially suitable for rapid, effective and simple laying on a central core. Finally, it is also possible to use a hybrid comprising both certain semi-finished products, in order to produce certain architectural aspects (such as plies, bead wires, etc.), whereas others are produced by direct application of compounds and/or reinforcing elements.

In the present document, to take into account recent technological developments both in the manufacturing field and in product design, the conventional terms such as "plies", "bead wires", etc. are advantageously replaced with neutral terms or terms that are independent of the type of process used. Thus, the term "carcass-type reinforcing member" or "sidewall reinforcing member" is valid for denoting the reinforcing elements of a carcass ply in the conventional process, and the corresponding reinforcing elements, which are in general applied to the sidewalls, of a tire built using a process without semi-finished products. As regards the term "anchoring zone", this may denote just as well the "conventional" carcass ply upturn around a bead wire of a conventional process as the assembly formed by the circumferential reinforcing elements, the rubber compound and the adjacent sidewall reinforcing portions of a bottom zone produced by a process with application on a toroidal core.

In general in heavy-goods vehicle tires, the carcass reinforcement is anchored on either side in the region of the bead and is surmounted radially by a crown reinforcement consisting of at least two superposed layers and formed from threads or cords that are parallel in each layer and crossed from one layer to the next, making angles of between 10° and 45° with the circumferential direction. Said working layers, forming the working reinforcement, may be covered with at least one protective layer formed from advantageously metal extensible reinforcing elements, called elastic elements. The crown reinforcement may also comprise a layer of low-extensibility metal threads or cords making an angle of between 45° and 90° with the circumferential direction, this ply, called triangulation ply, being located radially between the carcass reinforcement and the first crown ply called the working ply, these being formed from parallel threads or cords at angles of at most equal to 45° in absolute value. The triangulation ply forms, with at least said working ply, a triangulated reinforcement which undergoes, when subjected to the various stresses, little deformation, the essential role of the triangulation ply being to take up the transverse compressive forces to which all of the reinforcing elements in the crown region of the tire are subjected.

In the case of heavy-goods vehicle tires, a single protective layer is usually present and its protecting elements are, in most cases, oriented in the same direction and at the same angle in absolute value as those of the reinforcing elements of the radially outermost, and therefore radially adjacent, working layer. In the case of civil engineering vehicle tires, intended for running on more or less uneven ground, the presence of two protective layers is advantageous, the reinforcing elements being crossed from one layer to the next and the reinforcing elements of the radially inner protective layer being crossed with the inextensible reinforcing elements of the radially outer working layer adjacent to said radially inner protective layer.

The circumferential direction, or longitudinal direction, of the tire is the direction corresponding to the periphery of the tire and defined by the running direction of the tire.

The transverse or axial direction of the tire is parallel to the rotation axis of the tire.

The radial direction is a direction cutting the rotation axis of the tire and perpendicular thereto.

The rotation axis of the tire is the axis about which it rotates in normal use.

A radial or meridian plane is a plane that contains the rotation axis of the tire.

The circumferential median, or equatorial, plane is a plane perpendicular to the rotation axis of the tire and that divides the tire into two halves.

Certain current "road" tires are intended to run at high speed on increasingly long journeys, because of the improvements in road networks and the growth of motorway networks throughout the world. All the conditions, under which such a tire is called upon to run, without doubt enable the tire to be run for a larger number of kilometers, since the wear of the tire is less. However, the endurance of this tire is prejudiced. To permit one or even two retreading operations on such tires, so as to extend their lifetime, it is necessary to preserve a structure and especially a carcass reinforcement with endurance properties which are sufficient to withstand said retreading operations.

Prolonged running under particularly severe conditions of tires thus constructed effectively introduces limits in terms of endurance of these tires.

The elements of the carcass reinforcement are in particular subjected to flexural and compressive stresses during running which adversely affect their endurance. The cords that make up the reinforcing elements of the carcass layers are in fact subjected to large stresses when the tires are running, especially to repeated flexural stresses or variations in curvature, leading to friction between the threads, and therefore wear and fatigue: this phenomenon is termed "fatigue fretting".

To fulfill their function of strengthening the carcass reinforcement of the tire, said cords must firstly have good flexibility and a high endurance in flexure, which means in particular that their threads have to have a relatively small diameter, preferably less than 0.28 mm, more preferably less than 0.25 mm, generally smaller than that of the threads used in conventional cords for the crown reinforcements of tires.

The cords of the carcass reinforcement are also subjected to the phenomenon of "fatigue-corrosion" due to the very nature of the cords, which promote the passage of corrosive agents such as oxygen and moisture or even drain said agents. Specifically, air or water penetrating the tire, for example as a result of degradation following a cut or more simply because of the permeability, albeit low, of the inner surface of the tire, may be conveyed by the channels formed within the cords because of their very structure.

All these fatigue phenomena, which are generally grouped together under the generic term "fatigue-fretting-corrosion", are the cause of progressive degradation of the mechanical properties of the cords and may, under the severest running conditions, affect the lifetime of said cords.

To improve the endurance of these cords of the carcass reinforcement, it is known in particular to increase the thickness of the rubber layer that forms the internal wall of the cavity of the tire in order to minimize the permeability of said layer. This layer is usually composed partly of a butyl rubber so as to better seal the tire. This type of material has the drawback of increasing the cost of the tire.

It is also known to modify the construction of said cords so as in particular to increase their penetrability by the rubber and thus limit or even eliminate the passage of oxidizing agents via the channels formed within the cords. Tires thus produced demonstrate problems of air pockets appearing during tire manufacture.

Specifically, the various manufacturing steps result in the formation of occluded air pockets. In the case of tires having a carcass reinforcement formed from cords, the structure of which forms channels able to conduct air, these air pockets disappear because the air diffuses into the materials, especially through said channels existing within the cords. In the case of tires having a carcass reinforcement formed from cords having a structure which is highly penetrated by the rubber, these air pockets remain after the manufacturing steps. What occurs is merely a displacement of these air pockets during the step of curing the tire, these pockets moving towards regions where a low pressure is exerted. The displacement of the air takes place along the carcass reinforcement, following passages that exist between the reinforcing elements, the layers of rubber compound covering the reinforcing elements that form reinforcing regions parallel to the reinforcing elements before the step of curing the tire. These reinforcing zones thus allow the air to be moved slightly depending on the pressure that is exerted on the regions where the air pockets are. The pressure or the pressure variations arise particularly during the step of curing the tire or else during the shaping step, if this exists.

The appearance of these air pockets is usually unacceptable, depending on their location, and may require the tires to be scrapped, since said air pockets may become regions of weakness in the tire. The manufacturing costs therefore become unacceptable simply because of the poor production yields.

SUMMARY OF THE INVENTION

One object of the present invention is to provide heavy-goods vehicles with tires the wear performance of which is maintained for road usage and in particular the endurance performance of which is improved, especially with regard to "fatigue-corrosion" or "fatigue-fretting-corrosion" phenomena, irrespective of the running conditions, in particular in terms of inflation, the manufacturing cost of said tires remaining acceptable.

This object has been achieved according to one aspect of the invention by a tire having a radial carcass reinforcement, comprised of at least one layer of metal reinforcing elements, said tire comprising a crown reinforcement, which is itself covered radially with a tread, said tread being joined to two beads via two sidewalls, the metal reinforcing elements of at least one layer of the carcass reinforcement being non-hooped cords having, in the permeability test, a flow rate of less than 20 $cm^3$/min, at least one layer of the carcass reinforcement being provided on at least one face with textile threads directed mainly along a direction parallel to that of the metal reinforcing elements of said at least one layer of the carcass reinforcement, and said textile threads being corrugated about this main direction.

Advantageously, the textile threads are threads that provide the tire with no or practically no mechanical property, such as cotton threads. The textile threads may advantageously have air-draining properties. Furthermore, the increase in the overall weight of the tire because of the presence of these textile threads is completely negligible.

Also advantageously, the main directions of the textile threads are mutually parallel and the corrugations of the textile threads are in phase with one another.

Advantageously, the textile threads are placed on the axially outer surface in the sidewalls of the carcass reinforcement. In the case of a tire having bead wires around which the carcass reinforcement forms an upturn, the textile fibers are advantageously placed on the surface which is in contact with the bead wire. This positioning is particularly advantageous for ensuring complete elimination of the air pockets that form during manufacture of the tire, these essentially appearing on the axially and/or radially outer surface of the carcass reinforcement during manufacture.

Textile threads may also be placed on both sides of a carcass reinforcement layer.

In the case of a carcass reinforcement comprising several layers of reinforcing elements, each of said layers may comprise textile threads on at least one side.

The permeability test is used to determine longitudinal permeability to air of the tested cords, by measuring the volume of air passing through a test specimen under constant pressure for a given time. The principle of such a test, well known to those skilled in the art, is to demonstrate the effectiveness of the treatment of a cord for making it impermeable to air. The test has been described for example in the standard ASTM D2692-98.

The test is carried out on cords directly extracted, by stripping, from the vulcanized rubber plies that they reinforce, and therefore on cords that have been penetrated by cured rubber.

The test is carried out on a 2 cm length of cord, and therefore cord coated with its surrounding rubber composition (or coating rubber) in the cured state, in the following manner: air is sent into the cord, under a pressure of 1 bar, and the volume of air leaving it is measured using a flowmeter (calibrated for example from 0 to 500 $cm^3$/min). During the measurement, the cord specimen is blocked in a compressed seal (for example a seal made of dense foam or rubber) in such a way that only the amount of air passing through the cord from one end to the other, along its longitudinal axis, is taken into account in the measurement. The sealing provided by the seal itself is checked beforehand using a solid rubber test specimen, that is to say one without a cord.

The measured average air flow rate (average over 10 test specimens) is lower the higher the longitudinal impermeability of the cord. Since the measurement is made with an accuracy of ±0.2 $cm^3$/min, the measured values equal to or less than 0.2 $cm^3$/min are considered to be zero and correspond to a cord that may be termed airtight (completely airtight) along its axis (i.e. in its longitudinal direction).

This permeability test also constitutes a simple means of indirectly measuring the degree of penetration of the cord by a rubber composition. The measured flow rate is lower the higher the degree of penetration of the cord by the rubber.

Cords having in the permeability test a flow rate of less than 20 $cm^3$/min have a degree of penetration greater than 66%.

The degree of penetration of a cord may also be estimated using the method described below. In the case of a layered cord, the method consists firstly in removing the outer layer on a specimen having a length between 2 and 4 cm and then measuring, along a longitudinal direction and along a given axis, the sum of the lengths of rubber compound divided by the length of the specimen. These rubber compound length measurements exclude the spaces not penetrated along this longitudinal axis. The measurements are repeated along three longitudinal axes distributed over the periphery of the specimen and repeated on five cord specimens.

When the cord comprises several layers, the first, removal step is repeated with the newly external layer and the rubber compound lengths measured along longitudinal axes.

All the ratios of rubber compound lengths to specimen lengths thus determined are then averaged so as to define the degree of penetration of the cord.

The inventors have demonstrated that a tire produced in this way according to the invention leads to very advantageous improvements in terms of the compromise between endurance and manufacturing cost. Indeed, the endurance properties of such a tire are at least as good as with the best solutions mentioned above. The cords of the carcass reinforcement, having a flow rate of less than 20 $cm^3$/min in the permeability test, make it possible to limit the risks due to corrosion. Furthermore, the presence of the corrugated textile threads associated with at least one layer of the carcass reinforcement make it possible to drain the occluded air during manufacture of the tire and therefore leads to a higher productivity than that mentioned above and therefore to more advantageous costs. The inventors have demonstrated that the corrugation of the textile threads makes it possible to optimize, especially compared with straight threads, the probability of the occluded air meeting a "drain" either on formation of an air pocket or during movement of said air pocket along the direction parallel to the reinforcing elements of the carcass reinforcement layer during the steps of manufacturing the tire, as already mentioned. The tests carried out have confirmed that the results obtained with straight textile threads are not comparable with those obtained with corrugated textile threads according to the invention. This is because straight textile threads approximately parallel to the reinforcing elements of the carcass reinforcement do allow some of the occluded air pockets to disappear, but in many cases the remaining air pockets are sufficient to require the tire to be scrapped, whereas the corrugated textile threads allow almost all the tires thus manufactured to be retained, therefore bringing the manufacturing unit cost down to acceptable values.

The inventors have also demonstrated that the effectiveness of the textile threads for eliminating the occluded air during manufacture of the tire lies in particular in the fact that these threads are placed bare, that is to say they are not coated with a polymeric compound, such as a rubber, and they can thus capture the air and/or moisture over their entire length so as subsequently to drain said air and/or moisture. This is because threads or textile fabrics coated with rubber or else a rubber ply containing textile threads or a textile fabric would absolutely not have the same effect, only the ends of the textile threads being able to be in contact with the occluded air pockets. The presence of an air pocket in a region of a rubber-coated textile thread would be unable to be drained. So as not to retain occluded air pockets after manufacture of the tire, these air pockets must be able to be drained very quickly, especially during the vulcanization step. Rubber-coated textile threads are unable to provide such a function, the presence of a polymeric material retarding the diffusion of air and/or moisture.

In contrast, after vulcanization, the textile threads according to the invention are then embedded in the rubber of the tire. They remain effective for draining traces of air and/or moisture that may for example rise from accidental surface lesions of the tire or from the pressurized air within the cavity. The amounts to be drained are therefore much lower and the draining takes place over much longer times, these traces of air and/or moisture appearing slowly by diffusion through the rubber.

According to a preferred embodiment of the invention, the ratio of the pitch between two textile threads to the amplitude of the corrugation is between 0.5 and 1. Such a ratio makes it possible to optimize the region occupied by the textile threads on the carcass reinforcement layer along the direction perpendicular to the main laying direction of said threads and therefore perpendicular to the direction of the reinforcing elements of the carcass reinforcement layer. Such occupation of said region allows the air to be drained over the entire surface of the carcass reinforcement layer.

The pitch between two textile threads is measured along a direction perpendicular to the main direction of said textile threads and therefore perpendicular to the direction of the reinforcing elements of said at least one carcass reinforcement layer.

Also preferably, the ratio of the pitch between two textile threads to the pitch between the reinforcing elements of said at least one carcass reinforcement layer is greater than 10. Previously, the increase in the number of textile threads in relation to the number of reinforcing elements of the carcass reinforcement layer allows better draining to be achieved for a moderate cost. Since laying the textile threads has a certain cost, the number of threads laid must remain limited.

The pitch between the reinforcing elements of said at least one carcass reinforcement layer is measured along a direction perpendicular to the direction of reinforcing elements of said at least one carcass reinforcement layer.

Also preferably, the ratio of the corrugation period to the corrugation amplitude is between 5 and 20. Such a ratio results in a corrugation of the textile threads which makes it possible in particular to avoid the risks of textile threads breaking during the various phases in the manufacture of the tire because of the imposed stresses. A value of 20 guarantees sufficient drainage, excessively large periods possibly leading to a risk of not having a drain (textile thread) in a region in which the occluded air is present or is even moving.

Advantageously according to an embodiment of the invention, the reinforcing elements of said at least one carcass reinforcement layer are distributed with a constant pitch. Also advantageously, the pitch between the textile threads is constant and both the corrugation amplitude and the corrugation period are constant.

According to one advantageous embodiment of the invention, the metal reinforcing elements of at least one layer of the carcass reinforcement are cords having at least two layers, at least an inner layer being sheathed with a layer consisting of a polymer composition such as a crosslinkable or crosslinked rubber composition, preferably one based on at least one diene elastomer.

According to a preferred embodiment of the invention, the cords of the carcass reinforcement have, in the permeability test, a flow rate of less than 10 cm$^3$/min and more preferably less than 2 cm$^3$/min.

Another aspect of the invention is directed to a tire having a radial carcass reinforcement comprised of at least one layer of reinforcing elements, said tire comprising a crown reinforcement, which is itself covered radially with a tread, said tread being joined to two beads via two sidewalls, the metal reinforcing elements of at least one layer of the carcass reinforcement being non-hooped cords having at least two layers, at least an inner layer being sheathed with a layer consisting of a polymer composition such as a crosslinkable or crosslinked rubber composition, preferably one based on at least one diene elastomer and at least one layer of the carcass reinforcement being provided on at least one side with textile threads oriented mainly along a direction parallel to that of the metal reinforcing elements of said at least one carcass reinforcement layer, and said textile threads being corrugated about this main direction.

The expression "composition based on at least one diene elastomer" is understood to mean, as is known, that the composition comprises predominantly (i.e. with a mass fraction greater than 50%) this or these diene elastomers.

It should be noted that the sheath according to an embodiment of the invention extends continuously around the layer that it covers (that is to say this sheath is continuous in the "orthoradial" direction of the cord, which is perpendicular to its radius) so as to form a continuous sleeve having a cross section that is advantageously almost circular.

It should also be noted that the rubber composition of this sheath is crosslinkable or crosslinked, that is to say it includes, by definition, a suitable crosslinking system thus allowing the composition to crosslink while it undergoes curing (i.e. it cures and does not melt). Thus, this rubber composition may be termed "non-melting", because it cannot be melted by heating it to any temperature.

The term "diene" elastomer or rubber is understood, as is known, to mean an elastomer coming at least partly (i.e. a homopolymer or a copolymer) from diene monomers (monomers carrying two carbon-carbon double bonds, whether conjugated or not).

Diene elastomers, in a known manner, may be put into two categories: those called "essentially unsaturated" diene elastomers and those called "essentially saturated" diene elastomers. In general, an "essentially unsaturated" diene elastomer is understood here to mean a diene elastomer obtained at least partly from conjugated diene monomers having an original content of diene units (conjugated dienes) which is greater than 15% (mol %). Thus, for example, diene elastomers such as butyl rubbers or copolymers of dienes and α-olefins of the EPDM type do not fall within the above definition and in particular can be termed "essentially saturated" diene elastomers (having an original content of diene units that is low or very low and always less than 15%). In the category of "essentially unsaturated" diene elastomers, the term "highly unsaturated" diene elastomer is understood to mean in particular a diene elastomer having an original content of diene units (conjugated dienes) of greater than 50%.

Given these definitions, a diene elastomer that can be used in the cord according to the invention is understood more particularly to mean:
 (a) any homopolymer obtained by polymerizing a conjugated diene monomer having from 4 to 12 carbon atoms;
 (b) any copolymer obtained by copolymerizing one or more conjugated dienes with one another or with one or more aromatic vinyl compounds having from 8 to 20 carbon atoms;
 (c) a ternary copolymer obtained by copolymerizing ethylene, an α-olefin having 3 to 6 carbon atoms with an unconjugated diene monomer having from 6 to 12 carbon atoms, such as for example, the elastomers obtained from ethylene or propylene with an unconjugated diene monomer of the aforementioned type, such as for example 1,4-hexadiene, ethylidene norbornene and dicyclopentadiene;
 (d) an isobutene/isoprene copolymer (butyl rubber), and also halogenated, in particular chlorinated or brominated versions of this type of copolymer.

Although it applies to any type of diene elastomer, the present invention is primarily implemented with essentially unsaturated diene elastomers, in particular of type (a) or (b) above.

Thus, the diene elastomer is preferably chosen from the group formed by polybutadienes (BR), natural rubber (NR), synthetic polyisoprenes (IR), various butadiene copolymers, various isoprene copolymers and blends of these elastomers. More preferably, such copolymers are chosen from the group formed by stirene-butadiene copolymers (SBR), butadiene-isoprene copolymers (BIR), stirene-isoprene copolymers (SIR) and stirene-butadiene-isoprene copolymers (SBIR).

More preferably according to the invention, the diene elastomer chosen predominantly (i.e. in respect of more than 50 phr) consists of an isoprene elastomer. The term "isoprene elastomer" is understood to mean, as is known, an isoprene homopolymer or copolymer, in other words a diene elastomer chosen from the group formed by natural rubber (NR), synthetic polyisoprenes (IR), various isoprene copolymers and blends of these elastomers.

According to one advantageous embodiment of the invention, the diene elastomer chosen consists exclusively (i.e. for 100 phr) of natural rubber, synthetic polyisoprene or a blend of these elastomers, the synthetic polyisoprene having a content (in mol %) of 1,4-cis bonds preferably greater than 90%, and even more preferably greater than 98%.

It would also be possible to use, according to one particular embodiment of the invention, cuts (blends) of this natural rubber and/or these synthetic polyisoprenes with other highly unsaturated diene elastomers, especially with SBR or BR elastomers as mentioned above.

The rubber sheath of the cord according to an embodiment of the invention may contain one or more diene elastomers, it being possible for these to be used in combination with any type of synthetic elastomer other than those of diene type, or even with polymers other than elastomers, for example thermoplastic polymers, these polymers other than elastomers then being present by way of minority polymer.

Although the rubber composition of said sheath is preferably devoid of any plastomer and contains only a diene elastomer (or blend of diene elastomers) as polymeric base, said composition could also include at least one plastomer with a mass fraction $x_p$ which is less than the mass fraction $x_e$ of the elastomer(s). In such a case, the following relationship preferably applies: $0<x_p<0.5x_e$ and more preferably the following relationship applies: $0<x_p<0.1x_e$.

Preferably, the crosslinking system of the rubber sheath is a system called a vulcanization system, that is to say one based on sulphur (or on a sulphur donor) and a primary vulcanization accelerator. Added to this base vulcanization system may be various known secondary vulcanization accelerators or vulcanization activators. Sulphur is used with a preferential amount of between 0.5 and 10 phr, more preferably between 1 and 8 phr, and the primary vulcanization accelerator, for example a sulphonamide, is used with a preferential amount of between 0.5 and 10 phr, more preferably between 0.5 and 5.0 phr.

The rubber composition of the sheath according to an embodiment of the invention includes, besides said crosslinking system, all the common ingredients that can be used in rubber compositions for tires, such as reinforcing fillers based on carbon black and/or an inorganic reinforcing filler such as silica, anti-ageing agents, for example antioxidants, extender oils, plasticizers or processing aids, which make it easier to process the compositions in the uncured state, methylene donors and acceptors, resins, bismaleimides, known adhesion promoter systems of the RFS (resorcinol-formaldehyde-silica) type or metal salts, especially cobalt salts.

Preferably, the composition of the rubber sheath has, in the crosslinked state, a secant modulus in extension with 10% elongation (denoted M10), measured according to the ASTM D 412 (1998) standard, of less than 20 MPa and more preferably less than 12 MPa, in particular between 4 and 11 MPa.

Preferably, the composition of this sheath is chosen to be the same as the composition used for the rubber matrix that the cords according to the invention are intended to reinforce. Thus, there is no problem of any incompatibility between the respective materials of the sheath and the rubber matrix.

Preferably, said composition is based on natural rubber and contains carbon black as reinforcing filler, for example carbon black of ASTM 300, 600 or 700 grade (for example N326, N330, N347, N375, N683 or N772).

According to a variant of the invention, the metal reinforcing elements of at least one layer of the carcass reinforcement are layered metal cords of [L+M] or [L+M+N] construction usable as reinforcing element of a tire carcass reinforcement, comprising a first layer C1 having L threads of diameter $d_1$ where L ranges from 1 to 4, surrounded by at least one intermediate layer C2 having M threads of diameter $d_2$ wound together in a helix with a pitch $p_2$ where M ranges from 3 to 12, said layer C2 being optionally surrounded by an outer layer C3 of N threads of diameter $d_3$ wound together in a helix with a pitch $p_3$, where N ranges from 8 to 20, a sheath consisting of a crosslinkable or crosslinked rubber composition based on at least one diene elastomer covering, in the [L+M] construction, said first layer C1 and, in the [L+M+N] construction, at least said layer C2.

Preferably, the diameter of the threads of the first layer of the inner layer (C1) is between 0.10 and 0.5 mm and the diameter of the threads of the outer layers (C2, C3) is between 0.10 and 0.5 mm.

More preferably, the helix pitch with which said threads of the outer layer (C3) are wound is between 8 and 25 mm.

Within the meaning of the invention, the pitch represents the length, measured parallel to the axis of the cord, at the end of which a thread having this pitch makes one complete turn around the axis of the cord; thus, if the axis is sectioned by two planes perpendicular to said axis and separated by a length equal to the pitch of a thread of a constituent layer of the cord, the axis of this thread in these two planes has the same position on the two circles corresponding to the layer of the thread in question.

Advantageously, the cord has one, and more preferably still all of the following characteristics, which is/are confirmed:
  the layer C3 is a saturated layer, that is to say there exists insufficient space in this layer to add to it at least an (N+1)th thread of diameter $d_3$, N then representing the maximum number of threads that can be wound as a layer around the layer C2;
  the rubber sheath furthermore covers the inner layer C1 and/or separates the pairwise adjacent threads of the intermediate layer C2;
  the rubber sheath covers practically the radially internal semi-circumference of each thread of the layer C3 in such a way that it separates the pairwise adjacent threads of this layer C3.

In the L+M+N construction according to the invention, the intermediate layer C2 preferably comprises six or seven threads and the cord according to the invention then has the following preferential characteristics ($d_1$, $d_2$, $d_3$, $p_2$ and $p_3$ in mm):
  (i) $0.10<d_1<0.28$;
  (ii) $0.10<d_2<0.25$;
  (iii) $0.10<d_3<0.25$;
  (iv) M=6 or M=7;
  (v) $5\pi(d_1+d_2)<p_2 \leq p_3<5\pi(d_1+2d_2+d_3)$;
  (vi) the threads of said layers C2, C3 are wound in the same twist direction (S/S or Z/Z).

Preferably, characteristic (v) is such that $p_2=p_3$, in such a way that the cord is said to be "compact" considering moreover characteristic (vi) (threads of the layers C2 and C3 wound in the same direction).

According to characteristic (vi), all the threads of the layers C2 and C3 are wound in the same twist direction, that is to say either in the direction S ("S/S" arrangement) or in the direction Z ("Z/Z" arrangement). By winding the layers C2 and C3 in the same direction, it is advantageously possible in the cord according to the invention to minimize the friction between these two layers C2 and C3 and therefore the wear of the threads constituting them (since there is no longer crossed contact between the threads).

Preferably, the cord according to an embodiment of the invention is a layered cord of 1+M+N construction, that is to say that its inner layer C1 consists of a single thread.

Again advantageously, the $(d_1/d_2)$ ratios are preferably set within given limits, according to the number M (6 or 7) of threads in the layer C2, as follows:

for $M=6$: $0.9<(d_1/d_2)<1.3$;

for $M=7$: $1.3<(d_1/d_2)<1.6$.

Too low a value of the ratio $d_1/d_2$ may be prejudicial to wear between the inner layer and the threads of the layer C2. As for too high a value, this may impair the compactness of the cord, for a barely modified definitive level of strength, and may also impair its flexibility. The greater rigidity of the inner layer C1 due to too high a diameter $d_1$ could moreover be prejudicial to the very feasibility of the cord during the cabling operations.

The threads of the layers C2 and C3 may have the same diameter or this may differ from one layer to the other. Preferably, threads of the same diameter ($d_2=d_3$) are used, especially to simplify the cabling process and to lower the costs.

The maximum number $N_{max}$ of threads that can be wound as a single saturated layer C3 around the layer C2 depends of course on many parameters (diameter $d_1$ of the inner layer, number M and diameter $d_2$ of the threads of the layer C2, and diameter $d_3$ of the threads of the layer C3).

Preferably, according to an embodiment of the invention is implemented with a cord chosen from cords of 1+6+10, 1+6+11, 1+6+12, 1+7+11, 1+7+12 or 1+7+13 construction.

For a better compromise between strength, feasibility and flexural endurance of the cord, on the one hand, and penetrability by the rubber on the other hand, it is preferred for the diameters of the threads of the layers C2 and C3, whether identical or not, to be between 0.12 mm and 0.22 mm.

In such a case, it is preferred to have the following relationships, which are confirmed:

$0.14<d_1<0.22$;

$0.12<d_2 \leq d_3<0.20$;

$5<p_2 \leq p_3<12$ (small pitches in mm) or else
$20<p_2 \leq p_3<30$ (large pitches in mm).

A diameter less than 0.19 mm helps reduce the level of stresses undergone by the threads during the large variations in curvature of the cords, while it is preferred to choose diameters greater than 0.16 mm in particular for thread strength and industrial cost reasons.

One advantageous embodiment consists for example in choosing $p_2$ and $p_3$ to be between 8 and 12 mm, advantageously with cords of 1+6+12 construction.

Preferably, the rubber sheath has an average thickness ranging from 0.010 mm to 0.040 mm.

In general, the invention may be implemented, in order to form the carcass reinforcement cords described above, with any type of metal thread, especially steel thread, for example carbon steel threads and/or stainless steel threads. It is preferred to use a carbon steel but of course it is possible to use other steels or other alloys.

When a carbon steel is used, its carbon content (% by weight of steel) is preferably between 0.1% and 1.2%, more preferably from 0.4% to 1.0%. These contents represent a good compromise between the required mechanical properties of the tire and the feasibility of the thread. It should be noted that a carbon content of between 0.5% and 0.6% finally makes such steels less expensive, as they are easier to draw. Another advantageous embodiment of the invention may also consist, depending on the intended applications, in using low carbon steels, for example having a carbon content of between 0.2% and 0.5%, especially because they have a lower cost and drawing is much easier.

The cord according to the invention may be obtained by various techniques known to those skilled in the art, for example, in two steps: firstly a step in which the L+M intermediate structure or core (layers C1+C2) is sheathed via an extrusion head and secondly this step is followed by a final operation in which the N remaining threads (layer C3) are cabled or twisted around the thus sheathed layer C2. The problem of bonding in the uncured state posed by the rubber sheath, during possible intermediate winding and unwinding operations, may be solved in a manner known to those skilled in the art, for example by using an intermediate plastic film.

According to one embodiment of the invention, the crown reinforcement of the tire is formed from at least two working crown layers of inextensible reinforcing elements, which are crossed from one layer to the other making angles of between 10° and 45° with the circumferential direction.

According to other embodiments of the invention, the crown reinforcement also includes at least one layer of circumferential reinforcing elements.

A preferred embodiment of the invention also provides for the crown reinforcement to be supplemented, radially to the outside, by at least one supplementary protective layer consisting of elastic reinforcing elements oriented to the circumferential direction at an angle of between 10° and 45° and in the same sense as the angle made by the inextensible elements of the working layer that is radially adjacent thereto.

The protective layer may have an axial width smaller than the axial width of the narrowest working layer. Said protective layer may also have an axial width greater than the axial width of the narrowest working layer, such that it covers the edges of the narrowest working layer and, in the case of the radially upper layer as being the narrowest, such that it is coupled, in the axial extension of the additional reinforcement, to the widest working crown layer over an axial width so as thereafter, axially to the outside, to be decoupled from said widest working layer by profiled elements having a thickness of at least 2 mm. The protective layer formed from elastic reinforcing elements may, in the abovementioned case, on the one hand, be optionally decoupled from the edges of said narrowest working layer by profiled elements having a thickness substantially less than the thickness of the profiled elements separating the edges of the two working layers and, on the other hand, have an axial width smaller or larger than the axial width of the widest crown layer.

According to any of the embodiments of the invention mentioned above, the crown reinforcement may also be supplemented, radially to the inside between the carcass reinforcement and the radially internal working layer closest to said carcass reinforcement, with a triangulation layer of inextensible metal reinforcing elements made of steel making, with the circumferential direction, an angle of greater than 60° and in the same sense as that of the angle made by the reinforcing elements of the radially closest layer of the carcass reinforcement.

BRIEF DESCRIPTION OF THE DRAWINGS

Other details and advantageous features of the invention will become apparent below from the description of exemplary embodiments of the invention with reference to FIGS. 1 to 5 which show.

The figures have not been drawn to scale so as to make it simpler to understand them.

DETAILED DESCRIPTION OF THE DRAWINGS

Figure 1:
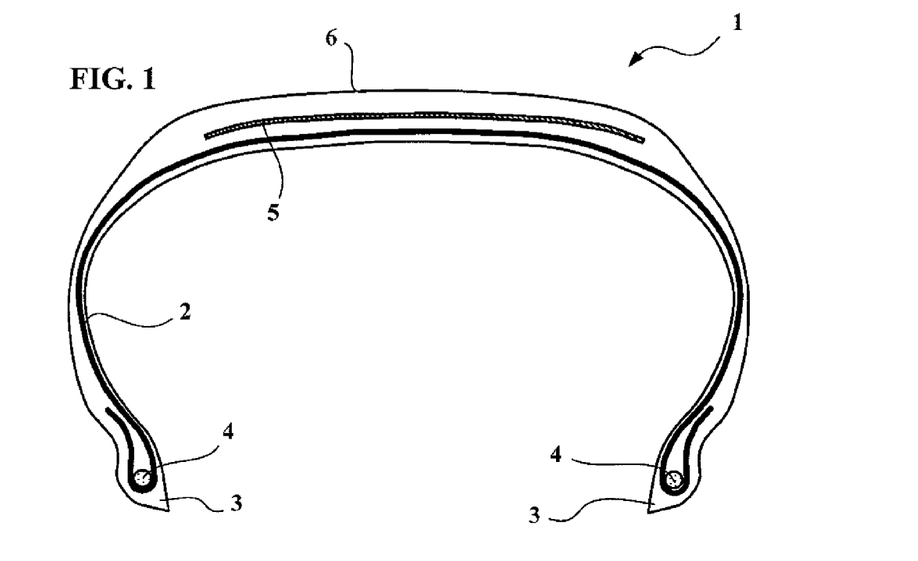
FIG. 1, a meridian view of a diagram showing a tire according to one embodiment of the invention.

In FIG. 1, the tire 1, of 315/70 R 22.5 type, comprises a radial carcass reinforcement 2 anchored in two beads 3 around bead wires 4. The carcass reinforcement 2 is formed by a single layer of metal cords. The carcass reinforcement 2 is hooped with a crown reinforcement 5 which is itself covered with a tread 6. The crown reinforcement 5 is formed, radially from the inside to the outside, from:

a first working layer formed from continuous non-hooped inextensible metal cords 11.35 over the entire width of the ply, said cords being oriented at an angle of 18°;

a second working layer formed from continuous non-hooped inextensible metal cords 11.35 over the entire width of the ply, said cords being oriented at an angle of 18° and crossed with the metal cords of the first working layer; and a protective layer formed from elastic metal cords 6×35.

All these layers constituting the crown reinforcement 5 have not been shown in detail in the figures.

Figure 2:
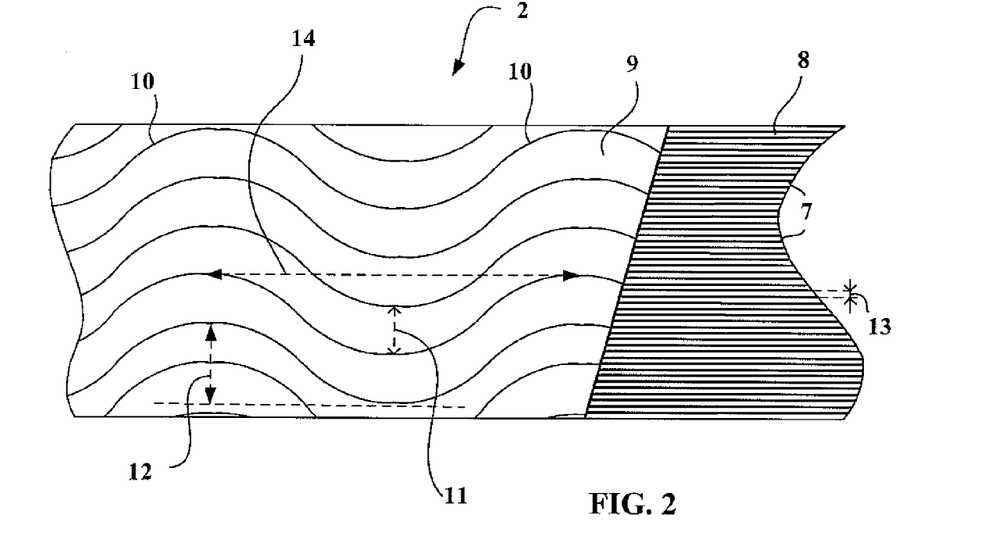
FIG. 2, a semi-cutaway schematic representation of a layer of carcass reinforcement of the tire shown in FIG. 1.

FIG. 2 illustrates a semi-cutaway representation of a carcass reinforcement layer 2 according to the invention. This layer consists of metal cords 7 oriented parallel to one another and held between two layers 8, 9 of rubber compound, referred to as calendering layers. Placed on the "outer" surface (which surface is not in contact with the metal cords) of the calendering layer 9 are cotton threads 10 that are corrugated about a main or mean axis oriented parallel to the direction of the metal cords 7. In accordance with the invention, the ratio of the pitch 11 between two cotton threads 10 to the corrugation amplitude 12 is equal to 0.63, and therefore is between 0.5 and 1.

The ratio of the pitch 11 between two cotton threads 10 to the pitch 13 between the metal cords 7 of the layer of carcass reinforcement 2 is equal to 11, and therefore greater than 10.

The ratio of the corrugation period 14 to the corrugation amplitude 12 of the cotton threads 10 is equal to 5.4, and therefore is between 5 and 20.

The cotton threads 10 are placed on the surface of the layer of carcass reinforcement 2 which comes into contact with the bead wire 4.

Figures 3, 4, 5:
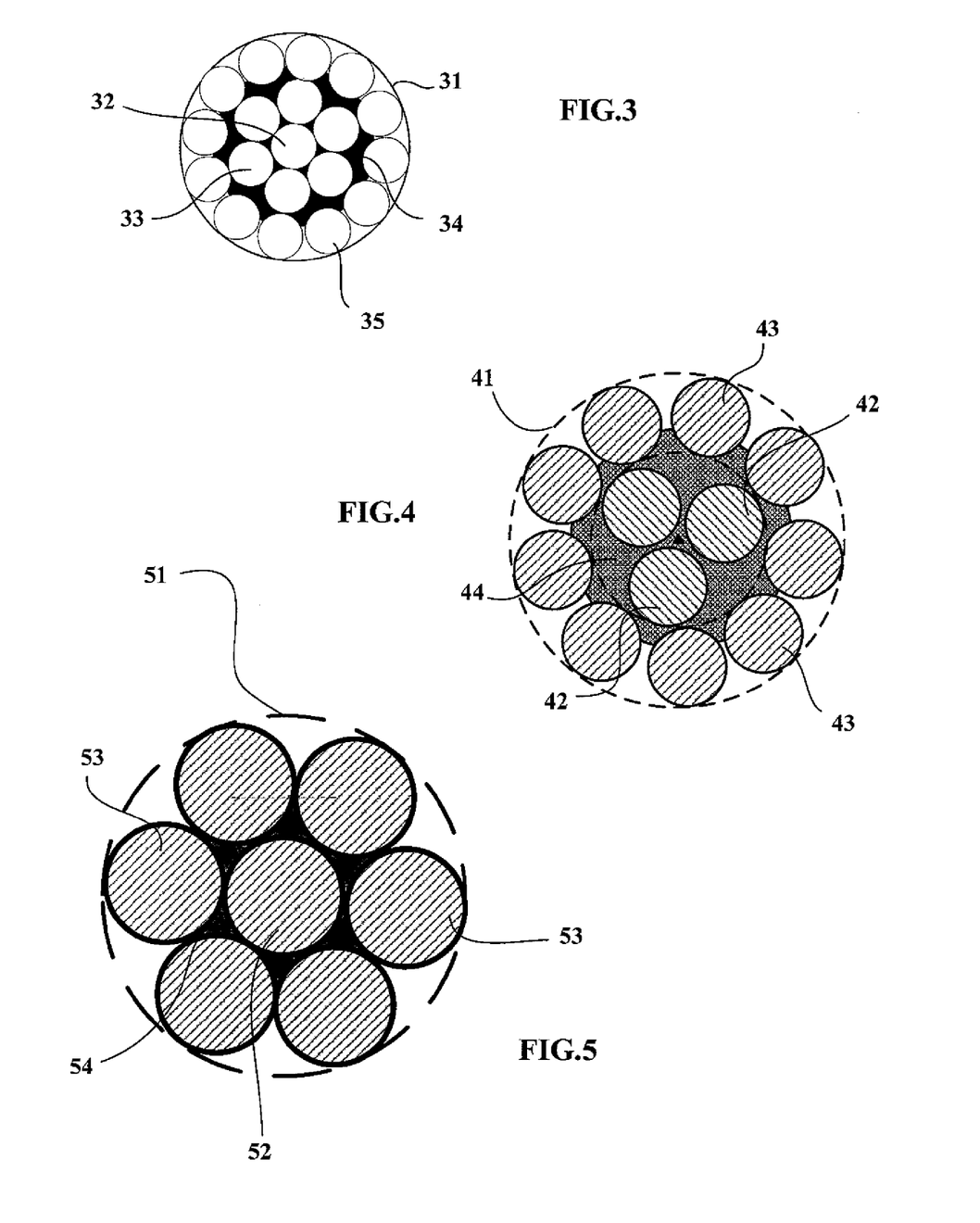
FIG. 3, a schematic representation in cross section of a carcass reinforcement cord of the tire shown in FIG. 1.
FIG. 4, a schematic representation in cross section of a first additional example of a carcass reinforcement cord according to an embodiment of the invention.
FIG. 5, a schematic representation in cross section of a second additional example of a carcass reinforcement cord according to an embodiment of the invention.

FIG. 3 illustrates a schematic representation of the cross section through a carcass reinforcement cord 31 of the tire 1 shown in FIG. 1. This cord 31 is a non-hooped layered cord of 1+6+12 construction, consisting of a central core formed by a thread 32, an intermediate layer formed from six threads 33 and an outer layer formed from twelve threads 35.

The cord has the following characteristics (d and p in mm):
1+6+12 construction;
$d_1$=0.20;
$d_2$=0.18;
$p_2$=10;
$d_3$=0.18;
$p_3$=10;
$(d_2/d_3)$=1;

where $d_2$ and $p_2$ are, respectively, the diameter and the helix pitch of the intermediate layer and $d_3$ and $p_3$ are, respectively, the diameter and the helix pitch of the threads of the outer layer.

The core of the cord consisting of the central core formed from the thread 32 and from the intermediate layer formed from the six threads 33 is sheathed by a rubber composition 34 based on an unvulcanized diene elastomer (in the uncured state). Sheathing of the core, consisting of the thread 32 surrounded by the six threads 33, carried out using an extrusion head, is followed by a final operation of twisting or cabling the 12 threads 35 around the core thus sheathed.

The penetrability of the cord 31, measured according to the method described above, is equal to 95%.

The elastomer composition constituting the rubber sheath 24 is made from a composition as described above and has, in the present case, the same formulation, based on natural rubber and carbon black, as that of the calendering layers 13 of the carcass reinforcement that the cords are intended to reinforce.

FIG. 4 illustrates a schematic representation of the cross section through another carcass reinforcement cord 41 that can be used in a tire according to the invention. This cord 41 is a non-hooped layered cord of 3+9 construction consisting of a central core formed from a cord consisting of three threads 42 twisted together and an outer layer formed from nine threads 43.

This cord has the following characteristics (d and p in mm):
3+9 construction;
$d_1$=0.18;
$p_1$=5;
$(d_1/d_2)$=1;
$d_2$=0.18;
$p_2$=10, where $d_1$ and $p_1$ are, respectively, the diameter and the helix pitch of the threads of the central core and $d_2$ and $p_2$ are, respectively, the diameter and the helix pitch of the threads to of the outer layer.

The central core consisting of a cord formed from three threads 42 was sheathed with a rubber composition 44 based on an unvulcanized diene elastomer (in the uncured state). The sheathing of the cord 42, carried out by an extrusion head, is followed by a final operation of cabling the nine threads 43 around the core thus sheathed.

The penetrability of the cord 41, measured according to the method described above, is equal to 95%.

FIG. 5 illustrates a schematic representation of the cross section through another carcass reinforcement cord 51 that can be used in a tire according to the invention. This cord 51 is a non-hooped layered cord of 1+6 construction consisting of a central core formed from a thread 52 and an outer layer formed from six threads 53.

This cord has the following characteristics (d and p in mm):
1+6 construction;
$d_1$=0.200;

$(d_1/d_2)=1.14$;
$d_2=0.175$;
$p_2=10$,
where $d_1$ is the diameter of the core and $d_2$ and $p_2$ are, respectively, the diameter and the helix pitch of the threads of the outer layer.

The central core consisting of the thread 52 was sheathed with a rubber composition 54 based on an unvulcanized diene elastomer (in the uncured state). The sheathing of the thread 52, carried out by an extrusion head, is followed by a final operation of cabling the six threads 53 around the core thus sheathed.

The penetrability of the cord 41, measured according to the method described above, is equal to 95%.

Trials were carried out on tires produced according to the invention as shown in FIGS. 1, 2 and 3 and other trials carried out on control tires.

The control tires differ from the tires according to the invention by cords 31 of the carcass reinforcement not having the sheathing layer 34 and not having any cotton threads on the surface of the layer of carcass reinforcement.

Rolling drum endurance trials were carried out on a test machine imposing a load of 4415 daN on the tires, which were run at a speed of 40 km/h, with oxygen-doped inflation of the tires. The trials were carried out on the tires according to the invention under conditions identical to those applied to the control tires. The running tests were stopped as soon as the carcass reinforcement of the tires showed degradation.

The trials thus carried out showed that the distances traveled during each of these tests are favorable for the tires according to the invention, which ran for 300 000 km, whereas the control tires traveled only 250 000 km.

Other rolling endurance trials on a vehicle driving axle were carried out by imposing a load of 3680 daN on the tires, which were run at a speed of 40 km/h, with a tire pressure of 0.2 bar. The trials were carried out on the tires according to the invention under conditions identical to those applied to the control tires. The running tests were carried out over a distance of 12 000 km or were stopped as soon as the carcass reinforcement of the tires showed degradation.

The trials thus carried out showed that the distances traveled during each of these tests by the tires according to the invention still allowed distances of 12 000 km to be achieved, whereas the control tires traveled at most only 10 000 km.

Furthermore, other types of tire have been manufactured. A first tire variant differs from the tires according to the invention by the absence of cotton threads.

In this first case, it turns out that the great majority of tires have visible defects on the sidewalls because of the presence of air pockets that make said tires unable to be commercialized.

A second tire variant differs from the tire according to the invention solely by cotton threads being placed in a non-corrugated manner and parallel to the metal cords of the carcass reinforcement layer.

In the second case, it turns out that the tires have fewer defects, but most of the manufactured tires remain unable to be commercialized.

The invention as described above especially with reference to the embodiment examples must not be understood as being limited to these examples. The textile threads may also be present on one or other side of a carcass reinforcement layer or else on both sides of the carcass reinforcement layer. In the case of several carcass reinforcement layers, the textile threads may also be present on one or more layers and on both sides of each of the layers.

The invention claimed is:

1. A tire having a radial carcass reinforcement, comprised of at least one layer of metal reinforcing elements, said tire comprising a crown reinforcement, which is itself covered radially with a tread, said tread being joined to two beads via two sidewalls, wherein the metal reinforcing elements of at least one layer of the at least one layer of metal reinforcing elements comprising the carcass reinforcement are non-hooped cords having a permeability test flow rate of less than 20 cm$^3$/min, wherein at least one layer of the at least one layer of metal non-hooped carcass cords is provided on at least one entire side with textile threads having air draining properties, the textile threads being oriented along a main direction parallel to that of the metal non-hooped carcass cords and wherein said textile threads are corrugated about this main direction.

2. The tire according to claim 1, wherein the metal non-hooped carcass cords are cords having at least two layers and wherein at least an inner layer is sheathed with a layer consisting of a polymer composition such as a crosslinkable or crosslinked rubber composition.

3. The tire according to claim 2, wherein the polymer composition is a diene elastomer chosen from the group formed by polybutadienes, natural rubber, synthetic polyisoprenes, butadiene copolymers, isoprene copolymers and blends of these elastomers.

4. The tire according to claim 2, wherein the polymer composition is a crosslinkable or crosslinked rubber composition based on at least one diene elastomer having, in the crosslinked state, a secant modulus in extension less than 20 MPa.

5. The tire according to claim 1, wherein the cords have a permeability test flow rate of less than 10 cm$^3$/min.

6. The tire according to claim 1, wherein the textile threads are spaced from each other with the same pitch and have the same value of corrugation period and corrugation amplitude, and wherein the ratio of the pitch between textile threads to the corrugation amplitude is between 0.5 and 1.

7. The tire according to claim 1, wherein the textile threads are spaced from each other with the same pitch and have the same value of corrugation period and corrugation amplitude, wherein the metal non-hooped carcass cords are spaced from each other with the same pitch, and wherein the ratio of the pitch between two textile threads to the pitch between the metal non-hooped carcass cords is greater than 10.

8. The tire according to claim 1, wherein the textile threads are spaced from each other with the same pitch and have the same value of corrugation period and corrugation amplitude, and wherein the ratio of the corrugation period to the corrugation amplitude is between 5 and 20.

9. The tire according to claim 1, wherein the metal non-hooped carcass cords are layered metal cords of L+M or L+M+N construction comprising a first layer C1 having L threads of diameter $d_1$ where L ranges from 1 to 4, surrounded by an intermediate layer C2 having M threads of diameter $d_2$ wound together in a helix with a pitch $p_2$ where M ranges from 3 to 12, said layer C2 being optionally surrounded by an outer layer C3 of N threads of diameter $d_3$ wound together in a helix with a pitch $p_3$, where N ranges from 8 to 20, and wherein a sheath consisting of a crosslinkable or crosslinked rubber composition based on at least one diene elastomer covers, in the L+M construction, said first layer C1 and, in the L+M+N construction, at least said layer C2.

10. The tire according to claim 9, wherein the diameter of the threads of the first layer C1 is between 0.15 and 0.5 mm and wherein the diameter of the threads of the layers C2, C3 is between 0.15 and 0.5 mm.

11. The tire according to claim 9, wherein the helix pitch with which said threads of the outer layer C3 are wound is between 8 and 25 mm.

12. The tire according to claim 1, wherein the crown reinforcement is formed from at least two working crown layers of inextensible reinforcing elements, which are crossed from one layer to the other making angles of between 10° and 45° with the circumferential direction.

13. The tire according to claim 12, wherein the crown reinforcement also includes at least one layer of circumferential reinforcing elements.

14. The tire according to claim 12, wherein the crown reinforcement is supplemented, radially to the outside, by at least one supplementary protective ply consisting of elastic reinforcing elements oriented to the circumferential direction at an angle of between 10° and 45° and in the same sense as the angle made by the inextensible elements of the working ply that is radially adjacent thereto.

15. The tire according to claim 12, wherein the crown reinforcement further includes a triangulation layer formed from metal reinforcing elements making angles of greater than 60° with the circumferential direction.

16. A tire having a radial carcass reinforcement comprised of at least one layer of metal reinforcing elements, said tire comprising a crown reinforcement, which is itself covered radially with a tread, said tread being joined to two beads via two sidewalls, wherein the metal reinforcing elements of at least one layer of the at least one layer of metal reinforcing elements comprising the carcass reinforcement are non-hooped cords having at least two layers, at least an inner layer being sheathed with a layer consisting of a polymer composition such as a crosslinkable or crosslinked rubber composition, wherein at least one layer of the at least one layer of metal non-hooped carcass cords is provided on at least one entire side with textile threads having air-draining properties, the textile threads being oriented along a main direction parallel to that of the metal non-hooped carcass cords and wherein said textile threads are corrugated about this main direction.

\* \* \* \* \*